United States Patent [19]

Bouche

[11] 4,259,541

[45] Mar. 31, 1981

[54] VIBRATION DAMPER FOR OVERHEAD ELECTRICAL CABLES

[76] Inventor: Raymond R. Bouche, 9419 Cordero Ave., Tujunga, Calif. 91042

[21] Appl. No.: 96,203

[22] Filed: Nov. 20, 1979

[51] Int. Cl.³ .............................................. H02G 7/14
[52] U.S. Cl. ..................................................... 174/42
[58] Field of Search ......................................... 174/42

[56] References Cited

U.S. PATENT DOCUMENTS

| 3,446,907 | 5/1969 | Bouche | 174/42 |
| 4,011,397 | 3/1977 | Bouche | 174/42 |

Primary Examiner—Laramie E. Askin
Attorney, Agent, or Firm—Reed C. Lawlor

[57] ABSTRACT

An improved multiple-mode damper for damping Aeolian vibrations of electrical cables is provided which employs a single mass and two resilient support members that are respectively connected between separate points of the mass and separate points of the cable. One resilient support member is located at or near the center of the mass and the other at a point remote therefrom. The resilient support members are composed of spring components and elastomer components that act in parallel. The elastomer material has a Shore hardness of at least 30 and a damping coefficient that is at least 10% of the critical value. The stiffness of the elastomer component is at least 10% of the stiffness of the spring and it is preferably greater than that of the spring.

8 Claims, 8 Drawing Figures

U.S. Patent  Mar 31, 1981  Sheet 1 of 2  4,259,541
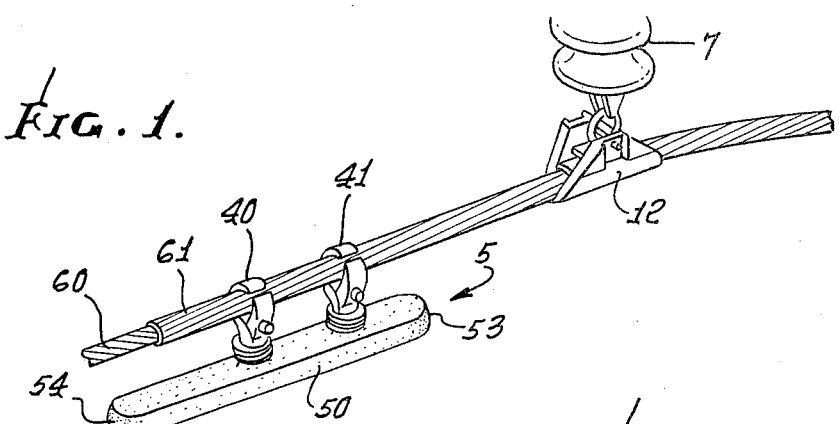
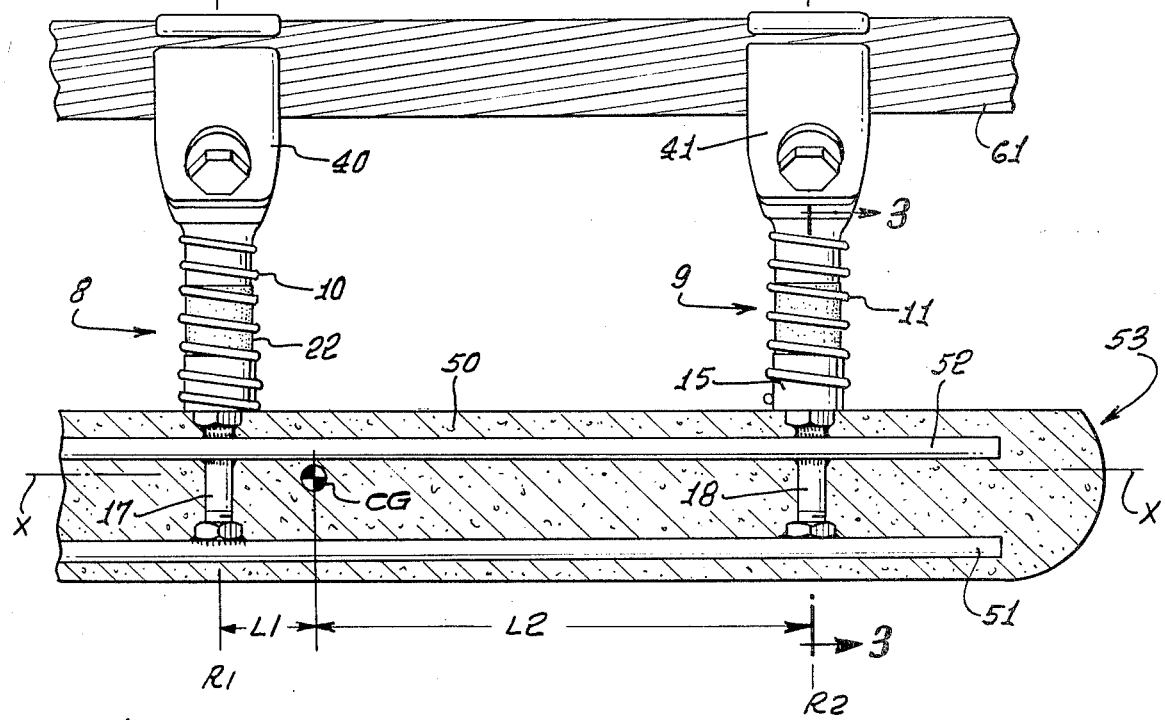
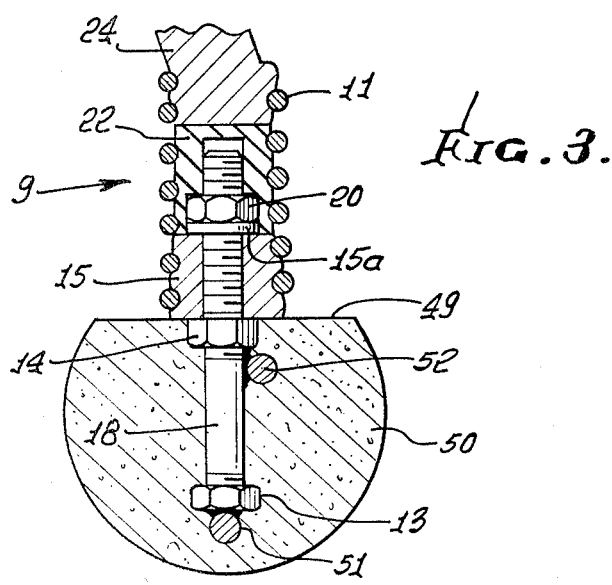

VIBRATION DAMPER FOR OVERHEAD ELECTRICAL CABLES

BACKGROUND OF THE INVENTION

This invention relates in general to vibration damping devices and, in particular, to an improved vibration damper for suspended electrical transmission cables and the like. In a typical suspended cable, Aeolian vibrations are induced in each span as a result of the wind flowing past it. The vibration is caused by vortices which are formed on the leeward side of the cable. These vortices alternate in direction, setting up alternating vertical forces which, in turn, cause the cable to vibrate, largely in a vertical plane. The frequency at which the directions of those vortices alternate is proportional to the wind velocity and inversely proportional to the diameter of the cable. As the wind speed increases, the frequency of alternation of the vortices increases, thereby causing the frequency of the resultant vibrations to increase likewise. The frequency of alternation of these vertical forces applied to the cable is the same as one of the resonance frequencies of that particular span and therefore the cable resonates. A particular span of cable, which is a continuous electrical conductor, suspended between two points, has a large number of resonance frequencies. The resonance frequencies of a particular cable span depend upon the weight per unit length of the cable, the span length, and the tension in the cable. They also depend upon the gravitational constant. The vibration pattern of the line takes the form of a sinusoidal deflection curve with the vibration originating in the span and traveling back and forth along the length of the span. Nodes are established at the ends of the span and, usually, both loops and nodes between the ends.

As the cable vibrates, it flexes at the points at which it is clamped and also undergoes significantly large values of dynamic mechanical stress. Such repeated flexing and great stress lead to fatigue failure in the cable and damage to suspension hardware. This vibration is substantially reduced over a wider range of wind speeds at both ends of a span as well as elsewhere in the span by means of a damper employing this invention installed at only one end of the span.

PRIOR ART

It is well known that vibrations of cables may be attenuated effectively by attaching multiple-mode dampers having two or more resonant frequencies. I have provided two such multiple-mode dampers in the past. They are described and claimed in my U.S. Pat. Nos. 3,446,907 and 4,011,397. Both dampers have attained multiple resonance frequencies by employing non-symmetrical resilient members. The non-symmetry resides in the stiffness of the resilient members and their placement with respect to the center of gravity of the mass or combinations of both. The first U.S. Pat. No. 3,446,907, describes an arrangement in which the two resilient members are connected by a single suspension device that is clamped to the cable. The later U.S. Pat. No. 4,011,397, employs separate clamps for connecting the two resilient members to different points of the cable.

SUMMARY OF THE INVENTION

The damper of the first patent was effective for small cables over a wide range of wind speeds and was frequently used at both ends of the span on large cables. When so used on large cables, they were effective for large cables over a narrow range of wind speeds and at both ends of the span when attached to only one end of the span.

We will sometimes refer to the damper described and claimed in my second patent, U.S. Pat. No. 4,011,397, as the multiple-point suspension damper. And that of the earlier Pat. No. 3,446,907, as the single-point suspension damper.

The multiple-point suspension damper has a number of advantages over the single-point suspension damper. More particularly, it has concentrated the resonance frequencies of the damper in the range of most critical wind speeds and has made it unnecessary, in many cases, to attach a damper at both ends of a cable span in order to achieve high damping over the range of most critical wind speeds. These advantages arose largely because of the multiple-point suspension characteristic.

The multiple-point suspension damper, however, has failed to provide as high damping above about 8 miles per hour wind speed as it has provided in the most critical range extending from about 2 miles per hour wind speed to about 8 miles per hour wind speed. Requirements have been made that a damper be provided that has high damping above about 8 miles per hour wind speed. This requirement is set forth in a performance requirement specified by the Bonneville Power Administration.

Multiple-Point Suspension

This invention is concerned with the provision of a vibration damper of the type described and claimed in my aforementioned patents which has all of the advantages of the aforementioned patents but which has high attenuation characteristics over a wide range of wind speeds above about 10 miles per hour as well as above about 5 miles per hour. More particularly, with this invention a multiple-point suspension damper is provided which has very high damping efficiency over a range of wind speeds extending from 3 miles per hour to 20 miles per hour for a cable of a diameter of 1.8 inches. With this invention I have been able to increase the attenuation from 80% to 95% in the neighborhood of wind speeds of 12 miles per hour and to increase it by a large factor at other wind speeds above 8 miles per hour.

Even though the invention is most important in multiple-point suspension dampers for large high-voltage cables, some of its features also are applicable to dampers, even single-point suspension dampers, applied to cables of smaller diameter and cables carrying lower voltage power.

In accordance with this invention, the resilient members of the multiple-point damper are so designed that the damper possesses two resonance frequencies that are much farther apart than heretofore having a ratio of three or more instead of the ratio of two heretofore achieved. In the embodiment of the invention illustrated, the resilient members now consist of two springs of unequal stiffness and rubber cores of high stiffness and high internal damping and the stiffness of the rubber cores is a significant fraction of the stiffness of the springs. Heretofore, the two steel helical coil springs were of equal stiffness, and they were filled with neoprene rubber Type R-180-V (more particularly, Rubatex 180 manufactured by Rubatex Corporation, Bedford, Virginia), sponge rubber of negligible stiffness compared with the stiffness of the springs. Heretofore the sponge rubber cores merely aided in damping the vibrations. They did not contribute any significant amount to the stiffness of the resilient members.

In this invention the core is composed of elastomeric material such as butyl rubber having a Shore rating of at least about 30.

In the new dampers produced in accordance with the present invention, I have been able to attain a lower resonance frequency of less than about 10 Hz and an upper resonance frequency of about 20 Hz for cables having a diameter of 1.8 inches. I have been able to provide a damper which meets the requirements of the performance requirement specified by Bonneville Power Administration and at the same time have provided a damper which produces high damping at the remote end of the span as well as the adjacent end of the span from which it is suspended. The requirements are set forth in BPA specification ETF60-25.2D dated Aug. 3, 1979.

The two principal advantages of this invention involve improving the vibration attenuation at high wind velocities of over 10 miles per hour as well as low wind velocities of 3 to 10 miles per hour and also increasing the resistance of the resilient members thereby reducing the deflection of the springs at the two resonance frequencies and other frequencies and thereby improving the fatigue resistance of the steel springs.

The foregoing and other objects and advantages and features of the invention will be more fully appreciated from the detailed description that follows and from the accompanying drawings.

DESCRIPTION OF THE DRAWINGS

In the drawings:

FIG. 1 is a perspective view showing an embodiment of the invention installed on an overhead power transmission line;

FIG. 2 is a partially cutaway front elevational view of an embodiment of the invention;

FIG. 3 is a cross-sectional view taken on the line 3—3 of FIG. 2;

DESCRIPTION

Figure 4A:
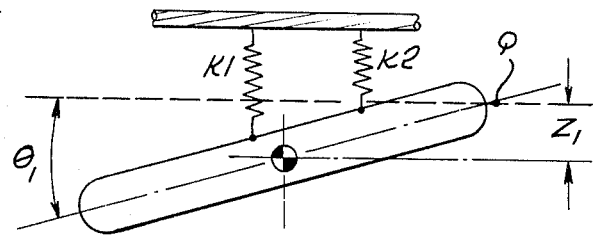
FIGS. 4a and 4b are diagrams employed in describing an aspect of the action of a damper.

The invention will be described particularly with respect to an improved damper that is suitable for use on a power line employing large cables having a diameter of 1.8 inches and a weight per unit length of 2.5 pounds per foot.

Referring to FIG. 1 there is illustrated a vibration damper 5 embodying the invention and mounted on a span of electrical cable 60 at a point spaced from an insulator 7 and shoe 12 from which the cable is suspended. In the embodiment shown armor rod 61 may cover the cable 60 at and near the point of suspension.

The vibration damper includes two clamps 40 and 41 by which the damper is rigidly attached to the cable 60 and free vibratory inertial member 50 is suspended asymmetrically therefrom by means of two resilient support members 8 and 9. Each clamp and spring assembly constitutes a resilient support member. For cables having diameters less than 1.5 inch, the clamps are clamped onto the armor rod. For larger cables they are clamped directly onto the cable.

The vibration damper of FIG. 1 possesses two interdependent modes of vibration characterized by two different resonance frequencies. In this improvement the differences between the resonance frequencies is made about 2 to 2.5. In the embodiment of the invention illustrated, this interdependence is achieved in part by employing two resilient support members 8 and 9, connected between the inertial member 50 and clamps 40 and 41 respectively, that have different values of stiffness and are arranged asymmetrically with respect to the center of gravity CG of the inertial member and in part by employing stiff elastomeric cores having damping coefficients that are high fractions of critical damping and in which the various parts have characteristics such that the dynamic mass of the damper 5, as viewed from the clamp, is high compared with the dynamic mass of the cable 60 as the resonance frequencies of the cable over a range of critical wind velocities. The critical wind velocities are those in the range of less than about 5 miles per hour up to about 15 miles per hour. The vibrations caused by wind speeds in this range create high alternating stresses in suspended cables that may result in rapid cable fatigue and failure. Vibrations in this wind speed range may also cause damage to suspension hardware.

In the embodiment of the invention illustrated, the inertial member 50, as shown in FIGS. 1 and 2, is an elongated member having a predominantly cylindrical body with spherical, or rounded, ends, and a flat top surface or side 49. The longitudinal axis of the inertial member X—X is that axis about which the moment of inertia of the inertial member is a minimum. For convenience, the end of inertial member 50 to which the midpoint between equally resilient springs 10 and 11 is closer is called the spring end 53. Likewise, the other end is called the mass end, or weight end 54.

Typically, the distance between the resilient support members 8 and 9 is greater than the length of either and is also greater than the distance between the flat surface of inertial member 50 and cable 60.

Reinforcing rods 51 and 52 extend through the inertial member 50 as shown in FIG. 2 and FIG. 3. These reinforcing rods extend along the direction of the longitudinal axis X—X of the inertial member 50.

Due to the relatively simple design of the inertial member 50, it may be formed inexpensively from a non-metallic material, such as concrete. The placement of the lower reinforcing rod 51 is not critical. However, upper reinforcing rod 52 is placed within the range of about one-quarter inch to about one-half inch from the flat upper surface of the inertial member to help preclude cracking during manufacture. The cement used to form inertial member 50 possesses hardening characteristics which increase with age, after casting. Thus, the likelihood of a crack occurring in the inertial member is reduced as a function of time.

The two resilient support members 8 and 9 of this invention are substantially identical except for the fact that the central coil spring 10 of one of them has six and one-half coils of slightly smaller diameter spring wire than the other coil spring 11 which has six coils of larger diameter spring wire in the same distance. The two springs encircle elastomer cores that contribute significantly to their stiffness. In the embodiment illustrated the soft resilient support member 8 has $3\frac{1}{2}$ turns about its core and the stiff resilient member 9 has 3 turns about its core. The two cores have the same dimensions. The advantages of the new resilient support members are explained more fully hereinafter.

As indicated in FIGS. 2 and 3, the two resilient support members are supported on two vertical threaded tap bolts 17 or 18 which are welded to the two reinforcing rods 51 and 52 and which extend vertically upwardly from the flat top surface 49.

The head of each of the tap bolts 17 and 18 is employed to help define the joint between the vertical bolts 17 and 18 and the lowermost horizontal rod 51. A nut 14 threaded onto each of the bolts 17 and 18 is flush with the upper surface 49 of the inertial member 50. Spring holders or anchors 15 are slideably attached on the upper ends of the bolts 17, 18, and are held in place there by means of lock washers 15a and nuts 20 which are threadably held in place at the upper ends of the vertical bolts 17, 18. Springs 10 and 11 are threaded onto the spring holders 15, together with cylindrical elastomeric members 22. The lower stub ends or stubs 24 of the clamps 40,41 threadably engage the upper ends of the springs 10, 11 and compress the rubber cylinders 22 tightly in place. Before the two resilient support members 8 and 9 have been assembled with the clamps 40,41, the frame formed of the reinforcing rods 51, 52 and the vertical bolts 17, 18 and nuts 14 is mounted in a suitable mold and the concrete is poured around the frame with the top surface of the cement flush with the upper surface of the nuts 14.

As indicated, the springs 10, 11 and the holders 15 and the stubs 24 are left-handed. The diameter of the wire of the coil spring 10 is 0.207 inch, and the diameter of the spring 11 is 0.250 inch, and the spring pitch of each of the anchors and of each of the stubs is slightly different from the pitch of the springs so as to lock them together after assembly.

Suitable materials for the clamps 40 and 41 are cast aluminum alloy, cast iron, and cast magnesium alloy. Stainless steel, music wire or other suitable spring steel material may be used for the springs 10 and 11.

In FIG. 2, the axis R1—R1 of the spring 10 and the axis R2—R2 of spring 11, are vertical and substantially parallel to each other and are also substantially perpendicular to the longitudinal axis X—X of the inertial member 50. The axis R1—R1 of spring 10 and the axis R2—R2 of spring 11 are substantially coplanar with the longitudinal axis X—X of the inertial member 50 and the longitudinal axis of the cable 60. It is also seen from FIG. 3 that the axes R1—R1 and R2—R2 lie in a plane which passes through the center of the inertial member 50.

As shown in FIG. 2, the distance L1 from the center of gravity CG of the inertial member 50 to the axis R1—R1 is substantially different from the distance L2 from the center of gravity CG of the inertial member 50 to the axis R2—R2. The distances L1 and L2 represent the distances between the center of gravity CG of the inertial member 50 and the axes R1—R1 and R2—R2 respectively.

As shown in FIG. 2, the effect of the springs 10 and 11 is non-symmetrical with respect to a plane perpendicular to the longitudinal axis X—X of the inertial member 50 and passing through the center of gravity CG of the inertial member. Furthermore, the difference in distances and spring constants accounts for the two resonance frequencies of this embodiment of the invention. The critical factor is neither the placement itself of the springs nor the relative stiffness itself of the springs. The critical factor is moment of stiffness, that is, the product of coefficient of stiffness of each spring and the distance of the spring from the center of gravity of the inertial member. When the moments of stiffness of the two springs are unequal, there are two interdependent modes of vibration in the vertical plane parallel to the longitudinal axis of the inertial member and passing through its center of gravity.

Dependence of vibration or interaction of two modes of vibration means that when the inertial member vibrates in one given mode, vibration in a second given mode will also necessarily occur. In the case where the moments of stiffness for the two springs are unequal, there will be dependence of interaction of two modes of vibration of the damper in a vertical plane parallel to the longitudinal axis of the inertial member passing through its center of gravity. In both modes of vibration there is a translational movement of the center of gravity along a vertical axis, and also a rotational movement of the inertial member about its own center of gravity.

Figure 4B:
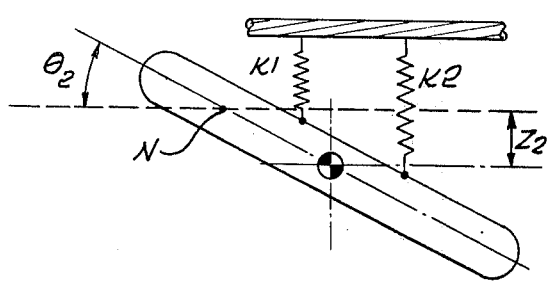

The two modes of dependent vibration are illustrated in FIGS. 4a and 4b. Both principal modes of vibration involve a vertical movement having a maximum displacement Z and a rotation through an angle $\theta$.

As indicated in FIG. 4a, one of these principal modes of vibration includes a rotation through an angle $\theta_1$ about an axis at a point Q displaced from the inertial member 50 on or near the spring end 53 and a vertical movement with a maximum displacement $Z_1$.

FIG. 4b shows a rotation $\theta_2$ about an axis through point N which is on the inertial member and displaced from the center of gravity towards the other end or mass end of the inertial member, and a vertical movement having a maximum displacement $Z_2$.

The upper ends of the vertical bolts extend throughout most of the length of the elastomer members 22. The elastomer members are compressed vertically to maintain them in compression, and hence stiff through any expected range of displacement during vibration due to wind.

The cores 22 may be composed of any solid elastomer having a damping coefficient which is a high percentage of critical damping and a stiffness that is a substantial fraction of the stiffnesses of the spring and having excellent weathering properties. Such materials have a long life of thirty or more years. At least two materials are now commercially available for use as such an elastomer. One is solid neoprene manufactured and sold by Crown Rubber Company, Pasadena, California. This material has a damping coefficient that is 10% of critical damping and a Shore hardness of 30. Another material that is available for use is butyl rubber, a synthetic rubber free of fillers manufactured and sold by Crown Rubber Company. This material has a damping coefficient that is 20% of critical and a Shore hardness of 50. Synthetic rubber material with fillers, such as butyl rubber with silica or carbon black, may be employed. Other suitable materials may be provided by special processing of neoprene, natural rubber, or synthetic rubber. While neoprene sponge has a high damping coefficiency of 20% of critical damping, it is not effective for the practice of the present invention because its stiffness is less than about 1% of the coil springs that are used. While it might be compressed to produce high stiffness, such material would be ineffective because it would then have a very short life. In practice, the elastomer material cores are compressed axially about 10% or less within the springs so that they will have high stiffness in tension as well as in compression.

The damping coefficients of the materials were measured by the procedure described in a document entitled "American Standard Nomenclature for Specifying Damping Properties of Materials," S2.9-1976, published by the American National Standard Institute.

The cores 22 have an external diameter of 1.300 inches and internal diameter of 0.5 inch and a length of 1.325 inches. The bolts have diameters of 0.5 inch. The cores 22 are cemented to the bolts 17, 18 and to the respective spring holders 15 and stubs 24 by means of an adhesive. As a result the cores have values of stiffness which are a significant fraction of those of the coil springs and form unitary structures with the respective springs.

The springs are fabricated of stainless steel having an inside diameter of 1.26 inches. The pitch of the central coil is 0.350 inch and that of the outer coil 11 has a pitch of 0.395 inch.

The damping characteristics of the damper that embodies this invention depend largely upon the fact that the central resilient member 8 is relatively soft while the end resilient member 9 is relatively stiff and that the stiffness of each depends not only on the characteristics of the springs 10 and 11 but upon the fact that the elastomers employed have values of stiffness factors that are at least a substantial fraction of the stiffness of the springs. Each core should have a stiffness which is at least 10% of the stiffness of the spring within which it is mounted so that the damping characteristics of the cores have a significant effect on the shape of the curves (see FIGS. 6 and 7). Best effects are obtained if the cores have values of stiffness greater than the stiffness of the respective springs. Since the stiffness of the cores is not constant but depends upon the stress to which they are subjected, the stiffness values of the resilient members 8 and 9 are non-linear.

In the particular embodiment of the invention described above the stiffness was measured by applying a static load of 100 lbs. in compression. Measured this way, the soft resilient member 8 had a stiffness of 400 to 500 lbs./in. and the stiffness of the stiff resilient member 9 had a stiffness in the range of 600-900 lbs./in.

With an inertial member weighing 32 lbs. and with the soft resilient member 8 at the center of gravity, the stiff resilient member 12 inches therefrom, the resonance frequencies of the two springs were about 10 Hz and 19.6 Hz respectively.

In another embodiment of the invention the two resilient members were employed but having four coils in the soft spring and 3½ coils in the stiff spring. In this case the resonance frequencies were approximately 7 and 13 respectively.

Since there is a discrepancy in the calculated values and the experimentally determined values of the resonance frequency, the term "resonance frequency" as used here refers to the value determined experimentally. This determination is made by mounting the damper on a test span and causing the span to vibrate at various frequencies in the range of interest. The low frequency is observed when the damper oscillates angularly about a node point at or near the spring end 53 of the inertial member, on the outboard side of the stiff resilient member. See Timoshenko, S., "Vibration Problems in Engineering" pages 232 and 233 (Van Nostrand, May 1953). The high frequency is determined by observing the frequency at which the damper oscillates angularly about a node point near the center of gravity. These observations are not very precise and may differ from the values quoted above by about 10% in either direction from the true values.

As the frequency of vibration increases, it is observed that the node point about which the inertial member oscillates angularly, advances from the spring end 53 of the inertial member to the free or mass end 54 thereof as the frequency of vibration increases.

In order to avoid any misunderstanding, it is pointed out that resonance frequencies experimentally determined this way are not necessarily the same as resonance frequencies determined by measurement of dynamic mass as was done in determining the resonance frequencies experimentally in my prior U.S. Pat. No. 3,446,907 (see Col. 8, circa line 70).

While some advantages of the invention may be achieved with other ratios of stiffness for the resilient members, excellent results have been obtained when the ratio of stiffness values was about 2 to 2.5.

Effectiveness of the Damper

The effectiveness of a damper for a cable is determined by measuring the residual vibration and the reflection vibration. The two terms apply particularly to a situation in which a single damper of the type described is mounted at one end of a span of cable.

The meaning of the terms, which have been explained in my prior U.S. Pat. No. 4,011,397, are explained briefly here in connection with FIG. 5 where the cable is illustrated as being mounted on two dead-end structures and forming a span that has three loops and two nodes at one of the many resonance frequencies of the span.

Figure 5:
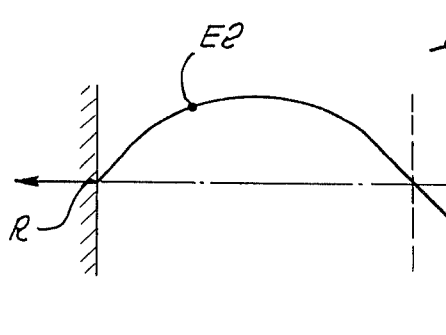
FIG. 5 is a diagram illustrating the procedure for measuring the vibration amplitude attenuation.

Referring to FIG. 5, residual vibration is defined as the amplitude of vibration of the cable at a point E3 at about midway between that end where the damper is mounted and the actual damper location divided by the amplitude of vibration of the cable at that same point with the damper removed. The reflection vibration is a ratio of the amplitudes of vibration at the point E2 near the end of the span remote from the end at which the damper is mounted under the two conditions mentioned.

Figure 6:
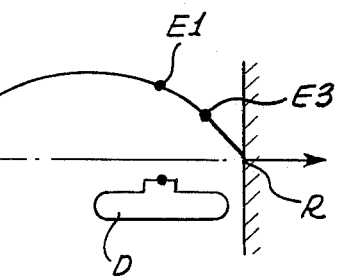
FIG. 6 is a composite representation of two graphs representing the residual vibration and the vibration amplitude attentuation of an old damper and the new damper.

In FIG. 6 there is shown measured values of residual vibration for two multiple-point suspension dampers, the old damper constructed in accordance with my prior U.S. Pat. No. 4,011,397, and the new damper described herein.

Figure 7:
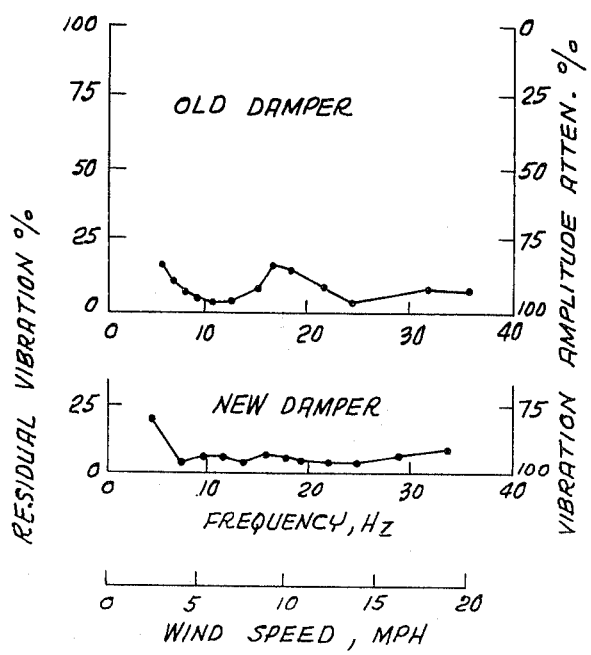
FIG. 7 is a composite representation of two graphs representing the reflection vibration and the vibration amplitude attenuation of an old damper and the new damper.

In FIG. 7 there is shown measured values of reflection vibration for the two dampers, namely, the old damper constructed in accordance with my prior U.S. Pat. No. 4,011,397, and the new damper described herein.

The advantages of this invention over the prior invention in a multiple-point suspension damper is brought out by comparison of these two pairs of graphs. Thus at a wind speed of about 9 miles per hour the new damper has a fourfold advantage over the old damper so far as residual vibration is concerned and about a sixfold advantage so far as reflection vibration is concerned. These numbers are not intended to be exact but merely to show the advantages of the present invention qualitatively. Exactitude is not present because the dampers were designed for mounting on different size cables and had different masses. Nevertheless, it is believed to be apparent that the high attenuation of vibration at higher wind speeds is obtained by means of the present invention.

From the foregoing description it may be readily seen that this invention provides a significant improvement over prior art dampers of the multiple-point suspension type by attenuating Aeolian vibrations throughout a wider range of wind speeds over the entire length of the span of suspended cable throughout a wider range of wind speeds even though the damper is installed at only one end of the span. The advantages of this invention are even greater when two dampers are employed on each cable span.

It will be apparent from the foregoing that the invention is not limited but that many changes may be made in the design and in the materials of which the various parts of the invention are constructed without departing from the scope of the invention as defined in the accompanying claims.

The invention claimed is:

1. In a device for damping Aeolian vibrations in a suspended cable,
   which device employs means including at least two resilient members for connecting an inertial member to said cable, one of said resilient members being connected to said inertial member near or at the center of gravity thereof and the other resilient member being connected to said inertial member toward one end thereof, the stiffness of said resilient members being such that the resonance frequency of free vibration in a vertical plane about a point at the one end of said inertial member is about twice the resonance frequency of free vibrations in a vertical plane about a point at or near the center of gravity of the inertial member, the improvement wherein at least one of said resilient members comprises a coil spring component and an elastomer component acting in parallel and in which said elastomer component has a Shore rating of at least 30 and a stiffness that is at least 10% of the stiffness of the spring and a damping coefficient that is at least 10% of the critical value.

2. In a device of the type defined in claim 1, wherein the stiffness of said elastomer component is at least about equal to the stiffness of said spring.

3. A damping device as defined in claim 1 wherein said elastomer component is composed of butyl rubber.

4. A damping device as defined in claim 1 wherein said elastomer component is composed of neoprene.

5. In a device for damping Aeolian vibrations in a suspended cable,
   which device employs at least two resilient members for connecting an inertial member to said cable, one of said resilient members being connected to said inertial member near or at the center of gravity thereof and the other resilient member being connected to said inertial member toward one end thereof, the stiffness of said resilient members being such that the resonance frequency of free vibration in a vertical plane about a point at the one end of said inertial member is about twice the resonance frequency of free vibrations in a vertical plane about a point at or near the center of gravity of the inertial member, said free vibrations being in a vertical plane parallel to the longitudinal axis of the inertial member, the improvement wherein each of said resilient members comprises a coil spring component and an elastomer core bound therein to form a unitary resilient member and in which said elastomer core has a Shore rating of at least 30 and a stiffness that is greater than the stiffness of the spring and a damping coefficient that is at least 30% of the critical value.

6. In a device of the type defined in claim 5 wherein the resilient member remote from the center of gravity has a stiffness that is greater than that of the resilient member at or near the center of gravity.

7. In a device of the type defined in claim 5 wherein the resilient member remote from the center of gravity has a stiffness twice that of the resilient member at or near the center of gravity.

8. A damping device as defined in claim 7 wherein said elastomer core is composed of a material selected from the group consisting of butyl rubber and neoprene.

* * * * *